United States Patent
Van Leeuwen et al.

(10) Patent No.: US 6,597,906 B1
(45) Date of Patent: Jul. 22, 2003

(54) MOBILE CLIENT-BASED STATION COMMUNICATION BASED ON RELATIVE GEOGRAPHICAL POSITION INFORMATION

(75) Inventors: George Willard Van Leeuwen, Rochester, MN (US); Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,854

(22) Filed: Jan. 29, 1999

(51) Int. Cl.[7] .............................. H04Q 7/20
(52) U.S. Cl. ........................ 455/422; 455/436
(58) Field of Search ................... 455/422, 436, 455/438, 439, 442, 440, 441, 443, 444, 456, 63

(56) References Cited

U.S. PATENT DOCUMENTS

| | | | | |
|---|---|---|---|---|
| 4,814,711 A | * | 3/1989 | Olsen et al. ............. 324/331 |
| 5,189,734 A | * | 2/1993 | Bailey et al. ............ 455/33.2 |
| 5,235,633 A | * | 8/1993 | Dennison et al. .......... 379/60 |
| 5,257,406 A | * | 10/1993 | Ito ..................... 455/56.1 |
| 5,568,654 A | * | 10/1996 | Fukawa ................. 455/33.1 |
| 5,835,377 A | | 11/1998 | Bush ................. 364/468.01 |
| 6,005,848 A | * | 12/1999 | Grube et al. ............ 370/266 |
| 6,038,444 A | * | 3/2000 | Schipper et al. ........... 455/421 |

* cited by examiner

Primary Examiner—Lester G. Kincaid
Assistant Examiner—Naghmeh Mehrpour
(74) Attorney, Agent, or Firm—Christopher H. Lynt; Matthew J. Bussan; James R. Nock

(57) ABSTRACT

Mobile client based wireless communication is enhanced by using geographical position information of a respective mobile client relative to one or more communication dead zones. When a mobile client is approaching a dead zone, data communications can be delayed until the dead zone is traversed, or given a higher priority to expedite transmission completion before dead zone entry. A mobile client communicates its position information to the base station, where this position information can be compared with the locations of respective dead zones. The base station can determine and communicate to a mobile unit, an estimated time before the mobile unit will enter a dead zone. The mobile unit can use this information to determine whether sufficient time remains before entering the dead zone to transmit one or more blocks of data, for instance.

18 Claims, 7 Drawing Sheets

Example of new packet protocol used by this invention.

400

MOBILE CLIENT-BASED STATION COMMUNICATION BASED ON RELATIVE GEOGRAPHICAL POSITION INFORMATION

BACKGROUND OF THE INVENTION

1. Field of the Invention

The invention relates to the field of telecommunications, and in particular, to wireless mobile telecommunications transmission/reception control based on relative geographical position information.

2. Background Information

Mobile communication, e.g., cellular telephone communication, usually involves the exchange of radio transmission signals between a mobile unit (mobile client) and a base station. With ground-based mobile units, these radio transmission signals are often subject to a number of phenomena which can limit communication, including naturally occurring variations in geography, such as hills and valleys. This is because mobile communications is often based on a point-to-point, line-of-sight transmission path between the mobile unit and the base station. Terrain variations, man-made obstacles, and the like, can interfere with the communications, resulting in what are called "dead zones."

Dead zones are geographical areas where communications signals do not penetrate or are too weak to provide for reliable communications. Such zones can be caused by radio signal shadowing, e.g., as occur when a mobile unit travels behind a hill, under a bridge or through a tunnel, or they can be due to signal reflections/images in radio signal patterns caused by the signals bouncing off radio-reflective objects, such as buildings, etc. An absorption of signals can also occur under certain circumstances resulting in a dead zone. For example, some non-reflective (¼ wavelength) coatings are known which are generally absorptive of particular radio signals, and such a phenomena can occur naturally as well.

Even though the cause of the dead zones may not change position, the physical extent of these dead zones can change over the course of a day due to atmospheric condition changes, for example, and they may even have a different physical extent from one season to the next. To provide reliable and efficient communications with mobile units in communication areas where dead zones are present, attempts are sometimes made to minimize their effects. For example, additional antennae may be placed to cover the areas affected. However, because of cost and other considerations, it is virtually impossible to eliminate all dead zones.

With the advent of enhanced mobile personal communications equipment beyond the simple voice cell-phone to relatively more complex mobile data transmission and receiving devices, dead zones have become more than just a simple annoying interruption of a telephone conversation.

Some examples of the types of communications that are being considered, developed and/or implemented include traffic information updates, static and dynamic point-to-point routing, remote diagnostics, user comfort settings, and regional radio station detection and selection. A Concept Car was shown at the 1997 COMDEX show in Las Vegas, which incorporates so-called "telematics." Telematics can include in car communication with the Internet for accessing e-mail, web pages, personal preference items (stocks, weather, sports, etc), memos, navigation, car security/safety (911), as well as being expanded for video/movies for the passengers, for example. Along with these personal communications tools, if appropriate, an interface to the on-board vehicle control and diagnostic computer bus through an engine compartment firewall could be provided so that the user or remote fleet management system (for trucks) can run diagnostics on the automobile engine, as well as monitor vehicle progress on a route.

It should be apparent that, should a mobile unit enter a dead zone during a data transmission, substantial time and bandwidth may be wasted attempting a complete retransmission of the data when communication is impossible. More serious consequences could result due to a partially garbled and/or delayed transmission. For example, an investor might be attempting to conduct an on-line trade in the stock market where a delay of even a few minutes could mean the difference between a profitable trade and a missed opportunity.

It can further be appreciated by those skilled in the art that mobile communications networks generally have to handle a large number of simultaneous mobile units attempting to communicate with a base station at any given time. To accommodate the units, multiplexing techniques are used where, for example, the limited base station bandwidth is divided into time slots and the units are time-division multiplexed. Generally, there is no prioritizing of transmission slot sharing and the resources are divided equally among units requesting transmission.

The present inventors realized that it would be advantageous to know exactly where the dead zones are relative to the mobile units in a communication system so that such problems could be anticipated and appropriate measures taken.

According to a copending application assigned to the same assignee as the present application, which became known to the present inventors subsequent to making their invention, Ser. No. 09/133,649, filed Aug. 13, 1998, entitled "ERROR CORRECTION FOR WIRELESS NETWORKS" (attorney docket YO998167): "methods, devices and systems are presented for providing service providers and/or end users of mobile stations to monitor and/or report regions with high error rates and/or dead zones . . . each mobile station periodically compares its current location with the data base [of locations with errors] . . . [T]he results of this comparison enables the mobile unit to anticipate connection problems" (Abstract, see also page 20, line 16 to page 21, line 18). The mobile unit uses an on-board GPS (global positioning satellite system) to get its current location (see page 8, lines 4 to 20).

Further, according to the copending application, the mobile units include an error rate monitor to monitor a reception error rate, and a message processor to send an error message to a base station when the error rate rises above a preset threshold (page 21, line 19 to page 22, line 8). A database that contains records of all error messages may be maintained, used to map areas of reception dead zones, and queried by a mobile user to determine if the user is entering a dead zone—the base station may then inform the mobile user of an appropriate step to take to maintain connectivity (page 22, line 15 to page 23, line 2). According to the copending application, a user may be given a route to avoid dead zones, and/or given a warning signal that the user is approaching a dead zone (page 23, lines 12 to 17).

However, sometimes taking steps to maintain connectivity may not be convenient or even possible. For example, if the mobile unit is a large truck or even a passenger car, it may be that there is no place to pull over the mobile unit, turn around or otherwise take another route to avoid a dead zone. In some areas, such as the U.S. East Coast Interstate 95 North-South corridor, alternative routes are either limited or non-existent.

In view of the above discussion, it is apparent that a need exists for additional ways to overcome the problems of potential data transmission losses and delays caused by unexpected or expected entries into dead zones.

A network processing system which ensures processing continuity by holding data received from a network accessible application for transmission to a mobile unit only when the mobile unit is in actual wireless communication with the network is known (see, e.g., U.S. Pat. No. 5,564,070).

A hierarchical communication system which provides adaptive data rate selection based on the detected quality of communication, and which provides for resolving conflicts among competing communications protocols on a priority basis, is known (see, e.g., U.S. Pat. No. 5,696,903).

A way of locating mobile end users of a communications system and routing messages to the end users as they roam between communication networks having local servicing offices is known. This is based on user specific information which is stored by the local servicing offices, and can be used to track the end users. Stored messages and data can then be routed and forwarded to the end users (see, e.g., U.S. Pat. No. 5,659,596).

A method of controlling communication services based on geographical information is known. Communication is restricted if the unit requesting communications services is within a restricted geographical location, such as in proximity to a hospital having sensitive RF (radio frequency) medical devices, or granted if the unit is not within a restricted location (see U.S. Pat. No. 5,778,304).

A global positioning system (GPS) is known in which a mobile or stationary unit can ascertain its present location, latitude, longitude and altitude, by the detection and processing of signals from geo-synchronous satellites. Such systems are used to navigate aircraft as well as ground based vehicles (see, e.g., U.S. Pat. No. 5,606,506) and have been used to track mobile stations (see, e.g., U.S. Pat. No. 5,564,079). A GPS system has been integrated with an inertial navigation system (see, e.g., U.S. Pat. No. 5,606,506).

The GPS has been used in conjunction with telephony to combine location identification with telephone number identification so that the geographical location of a particular telephone number user can be ascertained (see, e.g., U.S. Pat. No. 5,727,057).

The GPS has also been used in communication configuring of digital equipment based on its location using configuration data stored in the digital equipment (see, e.g., U.S. Pat. Nos. 5,635,940 and 5,581,261).

Another mobile communications tracking system which does not rely on GPS but instead uses signals exchanged with nearby cells is also known (see, e.g., U.S. Pat. No. 5,767,788).

However, despite these previous systems, there still existed a need for an improved mobile communication system. In prior systems, the transmitter of information may be notified by the receiver that some transmitted information was not received. The data may then be retransmitted or a time delay before retransmission may be used. In either case, if the reason for the lack of reception is due to the relative location of transmitter and receiver, i.e., relative to a dead zone, this information is not known by the transmitter or receiver. Wasted time and bandwidth may occur, if for example, a transmitter tries to repeat a transmission when the receiver is totally incapable of receiving the information. This might occur, for example, it the receiver is in a vehicle and the vehicle is inside of a tunnel which is naturally shielded from radio transmissions.

SUMMARY OF THE INVENTION

It is, therefore, a principle object of this invention to provide a method and apparatus for mobile client-based station communication based on position information.

It is another object of the invention to provide a method and apparatus that solves the above mentioned problems so that mobile communications can be accomplished more effectively.

These and other objects of the present invention are accomplished by the method and apparatus disclosed herein.

Considering the state of the art, the inventors recognized that data loss could be avoided if a communications system gave priority to a mobile unit transmitting or receiving data which was approaching a dead zone. Further, if the mobile unit knew of the approach of a dead zone, data transmission, either to or from the mobile unit in question, could be expedited or delayed. If the system could predict when a mobile unit would exit a dead zone, more efficient use of communications resources could be accomplished. Data to be transmitted to the mobile unit from the base station could be stored in anticipation of dead zone exit. Likewise, the mobile unit could buffer data transmission to the base station while in the dead zone in the same way.

Therefore, according to an aspect of the invention, scheduling of transmissions over any wireless system based on knowledge of the position of a mobile client (mobile unit) by another system is provided.

According to another aspect of the invention, the mobile client position information can be used together with stored position information about one or more dead zones to prioritize the transmission of data between a base station and the mobile client. For example, the position information allows the scheduling of data exchanges so that data transmissions are sure to be completed before a dead zone is entered. The type of data to be transmitted can be considered in the prioritization.

According to an aspect of the invention, from the geographical position information, data transfer between a mobile client and base station may be withheld until a more favorable geographic location becomes available. The data to be transmitted can be stored and transmission delayed until after a dead zone is exited, for example.

According to another aspect of the invention, from successive position readings, a trajectory of the mobile client can be determined. Based on the trajectory of the mobile client, a prediction of when more favorable transmission conditions will exist can be determined and used to prioritize communications in an efficient manner.

According to another aspect of the invention, the location of a mobile client relative to a base station can be provided by a positioning system, such as a Global Positioning Satellite/System (GPS), Doppler radar, visual contact, triangulation, an inertial guidance system (IGS), or any other equivalent geo-positioning system.

According to another aspect of the invention, in the base station, the respective locations of a plurality of dead zones are stored. For a ground-based mobile unit, the location of a dead zone can be stored, for example, as a two dimensional simplification using a sequence of $(x_{ij}, y_{ij})$ coordinates where $i=1, \ldots N$ and N is chosen to be a suitably large integer so that each $j^{th}$ dead zone is represented faithfully. For the purposes of estimating the available transmission time before the mobile client enters a dead zone, the boundaries of the dead zone are progressively refined as the mobile client approaches using a fractal-type methodology, minimizing the computations required to be performed by a processor at the base station, mobile client, or both.

According to another aspect of the invention, mobile client position information is communicated to the base station and information about the estimated time until the mobile client enters a dead zone is provided by the base station to the mobile client, implementing a two-way protocol.

According to another aspect of the invention, when the mobile client is in the dead zone, it uses information about the extent of the dead zone provided the base station to estimate the time when communication with the base station will again be possible.

According to another aspect of the invention, information about the boundaries of a dead zone, which may be dynamic, are included in the transmissions between the mobile unit and the base station after the mobile client has exited the dead zone. The base station uses this information to dynamically update a database containing the location and extent of dead zones.

According to another aspect of the invention, an iterative refinement of an estimate of an exact interception point with the dead zone continues up until the mobile client actually enters the dead zone. This refinement process a fractal-type process and the scale of the dead zone boundary is constantly improved, i.e., with increasing magnification, as the mobile client approaches the dead zone.

According to another aspect of the invention, even though when the mobile client is in the dead zone there is no further communication possible with the base station (by definition), the mobile client is still aware of its position through other means, that is, from geo-positioning data from a satellite system, e.g., GPS, or from some other system, e.g., an internal inertial guidance system. Before entering the dead zone, the base station may have sent relevant dead zone coordinates for the boundary at which point the mobile client is expected to exit the dead zone based on current trajectory, and Calculations can then be performed by a processor in the mobile client to anticipate dead zone exit. Alternatively, before the mobile client entered the dead zone, information concerning the expected time when the dead zone will be exited can be sent from the base station and the mobile client can anticipate dead zone exit based on time measurements. When there is a difference between the expected and actual dead zone exit time/coordinates, these differences can be used to adjust stored dead zone boundaries.

According to another aspect of the invention, under some circumstances, the mobile client will become immobile for an extended period of time. For example, a mobile client may encounter an unexpected delay. When the base station and/or mobile client does not establish communication within some tolerance surrounding the expected time of emergence from a dead zone, the communication is placed in a hold queue. When communication is again possible, the mobile client provides its position information to the base station and the communication link is removed from the hold queue.

According to another aspect of the invention, the exchange of position information is facilitated by use of a data transmission protocol that accommodates position information, for example, GPS data or other system position information. Assuming packet transmission (which is optimal in general for mobile communication), some packets include the position information (e.g., GPS data). Additionally, some packets can include the estimated time before a mobile client will enter a dead zone and/or how long communication will be interrupted. This information can be used to schedule transmissions between base station and mobile client.

According to another aspect of the invention, the above mentioned problems are solved by considering stored geographical information when a client/server communication is negotiated.

According to another aspect of the invention, known dead zone location information is used to schedule communication with a mobile unit, and dynamic updating of the stored dead zone location information based on detection of changed dead zone boundaries is also enabled.

The above-mentioned aspects of the invention, and other advantages and benefits of the invention which flow naturally therefrom, solve a number of problems and overcome a number of limitations related to data communication over a wireless mobile communication system, such as radio or optical, which is naturally interrupted by many obstacles in a transmission path.

According to an aspect of the invention, via a GPS, or other positioning system, for example, Doppler radar, inertial guidance, or another position device, located at a transmitter (server) and/or receiver (client), the transmission of data is biased towards those receivers which are currently in a clear reception path, i.e., not in a dead zone. This location knowledge permits a transmitter to decide when and to which mobile client information is sent, and thereby avoid wasted transmission resources.

According to another aspect of the invention, data loss is avoided because the communications system can grant priority to a unit transmitting/receiving data as it approaches a dead zone. In prior systems, generally there is no prioritizing of transmission slot sharing and the resources are divided equally among units requesting transmission in multiplexed mobile communications.

According to another aspect of the invention, data transmission can be delayed and the data stored in a hold queue when a mobile unit is approaching or is inside a dead zone, to be later transmitted after the mobile unit leaves the dead zone.

According to another aspect of the invention, successive mobile unit positions can be used to determine a rate and direction of travel of the mobile unit, and the rate and direction of travel (trajectory) can be used to predict when the mobile unit will enter and leave a particular dead zone so that communication can be coordinated therewith.

These and other aspects of the invention will become apparent from the detailed description set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

Figure 1:
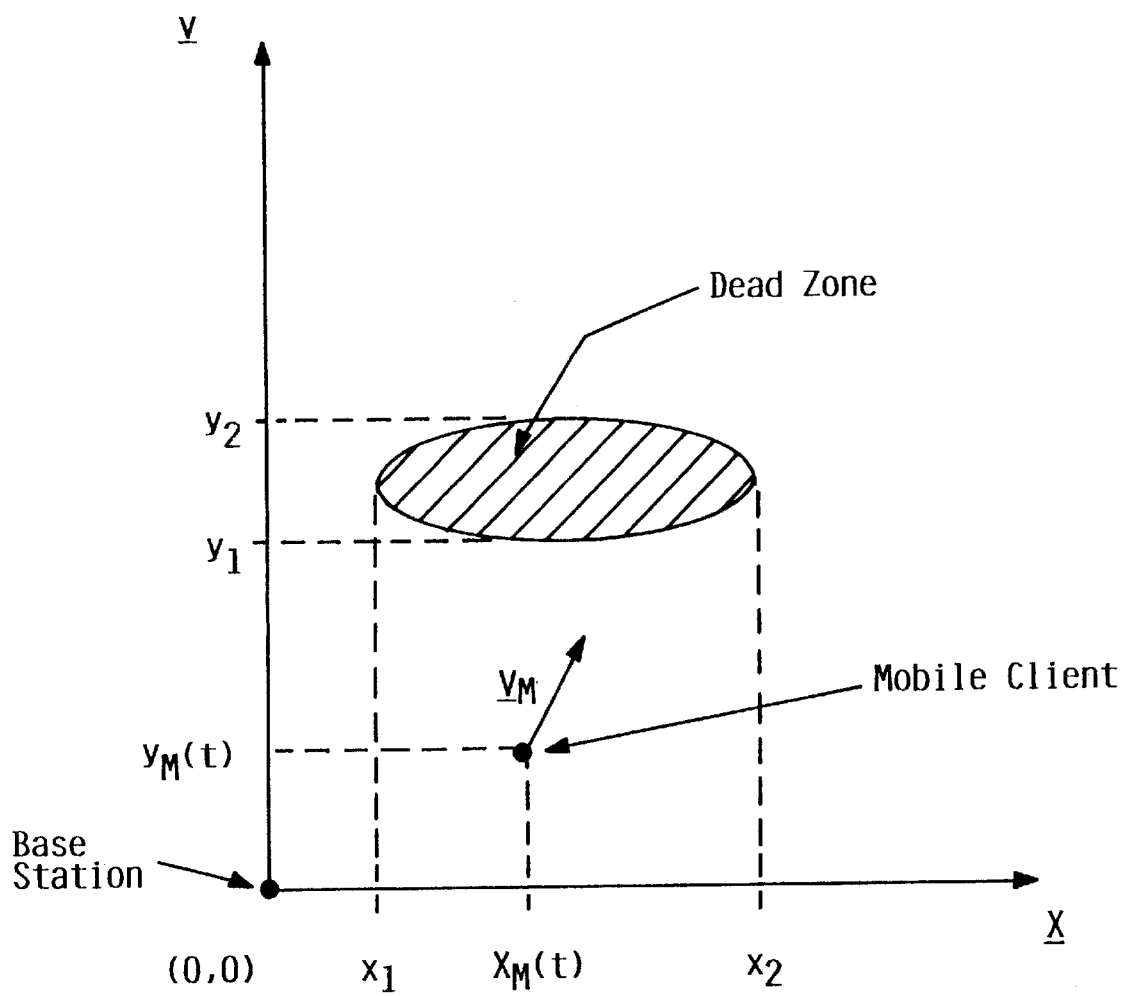
FIG. 1 illustrates a two-dimensional simplification of a mobile client, dead zone and base station scenario for explaining a method according to an exemplary embodiment of the present invention.

FIG. 1 illustrates a two-dimensional simplification of a mobile client, dead zone and base station scenario for explaining a method according to an exemplary embodiment of the present invention.

The invention addresses the problem of prioritizing the transaction of data between a base station and mobile client. In particular, the invention provides enhanced scheduling of data transmissions over any wireless means based on knowledge of the position of a mobile client by another system. The integration of geographical/global position information allows the scheduling of data exchange based on such factors as radio signal shadowing (e.g., under bridges, in tunnels), known reflection/images in radio signal patterns, etc. From the geographical position information, data transfer between a mobile client and base station may be withheld until a more favorable geographic location becomes available. Based on the trajectory of the mobile client, the anticipation of when more favorable conditions will exist can be determined and used to prioritize communications between clients and servers in the most efficient manner.

The location of a mobile client relative to a base station can be provided by a Global Positioning Satellite (GPS) system, Doppler radar, an inertial guidance system, visual contact, triangulation, or other means. For indoor systems, embedded sensors could be provided, as would be apparent to one skilled in the art. The exchange of this information between base station and mobile client according to another aspect of the invention is described later.

Consider the simple case depicted in FIG. 1, for a single mobile client and a single dead zone. In reality, there could be any number of mobile clients and dead zones, but the principles described below for the simple case can easily be extended to these with the addition of some priority procedure, that is, where a priority for transmission and reception of information is based on how close a given mobile unit is to a given dead zone, how much bandwidth is used by a given mobile unit, the urgency of the transmission, etc.

In the simple case of FIG. 1, the base station is assumed to be the origin of a 2-dimensional coordinate system which can easily approximate the surface of the earth over some local region served by the base station. Note that the location of the base station at (0,0) is purely for illustration purposes and can easily be shifted to be any geographical position desired in longitude and latitude, for example.

In the base station, the respective coordinates of a plurality of dead zones are stored. Such coordinates may be referred to sometimes herein as simply dead zone locations. Only one such dead zone is shown although there could be many such zones in a geographical area covered by the base station.

A dead zone location can be stored as a sequence of ($x_{ij}$, $y_{ij}$) coordinates where the index referring to a particular x,y coordinate pair i=1, . . . N. So that each jth dead zone is represented faithfully, N is chosen to be a suitably large integer. This is, of course a two-dimensional simplification of the three-dimensional general case which is perfectly acceptable for a ground-based mobile unit since any ground position will have a fixed altitude. However, for a non-ground-based mobile unit, such as an aircraft or spacecraft, the dead-zone third dimension would be taken into account. The invention is applicable to the general three-dimensional case by extension, the two-dimensional simplification being presented for purposes of explanation. As is known, the GPS system, for example, provides latitude, longitude and altitude data.

It should also be noted that when hyper-dimensional travel (travel in greater than three-dimensions, i.e., through hyper-space) is achieved, assuming that communications through hyper-space are possible and that dead zones exist in hyper-space, additional dead zone dimensions would be considered as required, according to the invention.

It will be demonstrated that for the purposes of estimating the time remaining before the mobile client enters a dead zone, the boundaries of the dead zone are progressively refined as the mobile client approaches. This is a fractal-type methodology that advantageously minimizes the required computations that need to be performed by either a processor at the base station or mobile client or both. This could be implemented by having the base station server processor, for example, store dead zone boundaries in a fractal form so that details of a boundary can be made progressively more detailed as a mobile unit approaches the dead zone.

As is known, the term fractal is derived from "fractional geometry." Simply put, a fractal is a self-similar thing that has a fractional dimension. For example, a complex, twisting coastline or the outline of a tree's branch structure, is something which theoretically has an infinite length and can be considered more than just a one-dimensional line but less than a two-dimensional plane. A well known "fractal" is the Koch curve, which is a 1.2618-dimensional object, that is, an object having a fractional dimension. Imagine a straight line, which is a one-dimensional object. Now, put a kink in the line, making it more complex than a straight line, but not yet a plane. Next put a kink in each line segment formed by the first kink, and so on. The result is the Koch curve. The kinks have caused the one-dimensional line to grow towards becoming a two-dimensional plane, since the original line expands in the "height" direction, however, it is not a two-dimensional object, like a plane, because it is not a closed curve. Another example is the so-called Sierpinski's triangle (or gasket). To form this object, one starts with a two-dimensional filled triangle, and then remove the middle triangle of the filled triangle, which leaves behind inside the original triangle, three smaller filled triangles. The process is repeated for the smaller triangles, and so on an infinite number of times. The result is something dimensionally less than the original two-dimensional triangle, but more than simply a one-dimensional line, i.e., an object said to be approximately 1.5850-dimensional.

Returning to FIG. 1, when the mobile client is far from the illustrated dead zone, the boundaries of the dead zone are approximated by its "corners:" ($X_1$, $Y_1$) and ($X_2$, $Y_2$). That is, at some distance, the dead zone can be approximated as a linear region between points $(X_1, Y_1)$ and $(X_2, Y_2)$, i.e., a one-dimensional line. For the purposes of this analysis, it can be assumed that the terrain between the dead zone and the land-based mobile unit (client) is flat so that the height of the dead zone can be disregarded. (At a sufficiently large distance, the dead zone could be approximated as a zero-dimensional point.)

As the mobile client approaches the dead zone, the dead zone boundary is more complex than the simple one-dimensional line, but something less than a two-dimensional plane, i.e., a fractal-type boundary. For the purposes of determining an approximate time before the mobile client reaches the dead zone boundary, as the mobile client gets closer, the approximation should and can be refined to be more accurate. When the distance is great, a rough estimate is acceptable since the time before the mobile client reaches the dead zone boundary may be on the order of half an hour, for example, giving ample time to prepare for dead zone entry. However, as the distance grows smaller, and the time scale is reduced to minutes, a more precise estimate of the time is clearly required. As already mentioned, this could be implemented by having the base station server processor store dead zone boundaries in a fractal form so that details of a boundary can be made progressively more detailed as a mobile unit approaches the dead zone.

As can be appreciated, like other real-world phenomena, such as tree-branch structures, the boundary of a dead zone does not adhere to purely Euclidean geometry, i.e., it is probably not a perfectly smooth curve or boundary line. However, this does not mean that it is immune to mathematical modeling. A complex, even randomly irregular object, such as the dead zone boundary the invention is dealing with, can be modeled approximately using a fractal approach, as will now be explained using the concept of iterative function systems (IFS's).

An iterative function system (IFS) is essentially a system of mappings from one coordinate system to another. In particular, it is a system of functions, e.g., affine transformations, that is iterated many times. An affine transformation can be represented by combination of a rotation, a reflection, and a translation. As a simple example, a random method will be described. It begins with an object defined by a boundary or "bounding" frame, and subdivided it into some number of frames within the bounding frame, having a size and orientation with respect to the bounding frame which will define the reflection, rotation and translation (the affine transformation) in the result. Then the method picks any point inside the bounding frame, and maps it to a randomly selected subdividing frame within the bounding frame. By "map" is meant placing a new point within the randomly selected subdividing frame positioned relative to the subdividing frame just as the original point was positioned relative to the bounding frame. That is, if the original point was in the middle of the bounding frame, then the new point would be positioned in the middle of the randomly selected subdividing frame. This new point will have a different position relative to the bounding frame than the original point. The new point is then mapped into another randomly selected subdividing frame, and so on. The result of these repetitive affine transformations converges on a fractal. The random IFS method of generating fractals does not produce "perfect" fractals, however it is computationally undemanding. It was "random" because the subdividing frame was selected randomly. There is also a deterministic IFS method. In the deterministic method, every point in the bounding frame is first mapped into each of the subdividing frames. The each subdividing frame is subdivided itself into the same number of original subdividing frames. That is, if there were originally four subdividing frames, each would be divided into four frames, for a total of sixteen frames. The mapping of each point in the original four subdividing frames into their respective four frames is then performed, and so on.

Other fractal methods are known, for example a relatively newer fractal method (circa 1968) is called the L-system fractal method after its designer, Aristrid Lindenmayer. One characteristic of fractals which bears mentioning is their so-called "self-similarity." That is, reduced versions of the fractal appear throughout the fractal. When a portion of a fractal is magnified, the magnified portion replicates the overall fractal. Further, a fractal can be used to describe any process or image or object that exhibits this self-similarity characteristic. Interestingly, laser generated holographs exhibit this characteristic, as do many naturally occurring phenomena. A well-known fractal geometry is the so-called Mandelbrot set, named for IBM mathematician, Benoit B. Mandelbrot, who is credited with coining the term "fractal." The Mandelbrot set is infinitely complex, yet can be fully described with a 10-line computer program.

A fractal model of the dead zone boundary is useful because of the self-similarity characteristic described above. Approaching the dead zone boundary is analogous to enlarging a fractal edge, that is, increasing the magnification of the fractal. As mentioned above, reduced versions of the fractal appear throughout the fractal no matter what the scale, i.e., magnification. Applying a fractal model to the dead zone boundary simply means that an iterative fractal-like methodology is used to refine the time estimate as the mobile unit gets closer to the boundary.

The mobile client is shown in FIG. 1 located at coordinates $(X_M(t), Y_M(t))$. The "t" indicates that the position of the mobile client is a function of time, i.e., the position of the mobile client will change over time as the mobile client moves. As the mobile client instantaneous position changes over time, a trajectory, i.e., a direction of travel, and a rate of travel can be surmised. An instantaneous position (current position), a direction of travel, and a rate of travel, at a given point in time, is referred to herein a "position information." This instantaneous location and trajectory, i.e., position information, is periodically communicated to the base station according to another aspect of the invention, in particular, using a novel packet protocol which is described below.

Based on the position information received by the base station and pre-stored dead zone location information stored at the base station, information about the estimated time until the mobile client enters a particular dead zone can be determined by the base station and communicated to the mobile client. This two-way exchange of information is another advantageous aspect of the invention. Computational power can be advantageously located at the base station, accomplishing the enhanced functionality, while keeping the required size and complexity of the mobile unit at an acceptable level.

Further, when the mobile client has entered a dead zone, it can use information about the extent of the dead zone previously provided by the base station to estimate the time when communication with the base station will again be possible. This is yet another advantageous feature of the invention. The mobile client can avoid a disadvantageous waste of resources trying to communicate with the base station when in the dead zone. Also, the instant that communication is again possible, the mobile client can be ready to begin transmission, having anticipated dead zone exit time. While traversing the dead zone, the mobile client could go into a sleep mode to conserve energy with a timer set to wake it up at the anticipated dead zone exit time. Alternatively, the mobile unit could periodically "ping" the base station to see if communications can be reestablished. The latter would be useful for situations where dead zones, or areas within a dead zone, are known to change dynamically and/or apparently randomly, i.e., there may be times and places when communications can be reestablished but these must be tested for because they are not wholly predictable. Although the testing uses some resources, if the testing determines that communication can be reestablished, the gain in efficiency may be worth the effort.

Further, new information about the boundaries of a dead zone, which can be dynamic, can be included in the transmission from the mobile client to the base station after exiting the dead zone, for example. The base station can advantageously use this dead zone information to update the database containing the location and extent of dead zones, if appropriate. This could be implemented by, for example, at some time prior to the anticipated entry of a dead zone, sending a test signal from the base station to the mobile client such that at the moment the test signal is lost, indicating a dead zone entry point, instantaneous location information can be stored in the mobile unit for later transmission to the base station. Similarly, just prior to anticipated exit of the dead zone, the mobile unit could begin transmission of position information which, when received by the base station, would indicate an exit point boundary of the dead zone. Should a sufficient statistically meaningful pattern emerge from this, for example, that a particular dead zone has a predictable extent at a particular time on a particular day of the year, or under other recognized circumstances, this can be integrated into the data base for additional gains in efficiency.

This aspect of the invention is analogous to the information provided to ground control stations by airline pilots regarding the location of air turbulence. These updates allow ground control to more accurately estimate where turbulence exists which benefits other airliners in the area. In a similar fashion, these dead zone "updates" provided by mobile client(s) can benefit the base station(s) and other mobile clients. Considering FIG. 1, a measure of the estimated time until the mobile client enters the dead zone, $\Delta t_\theta$, is given by:

$$\Delta t_\theta = [Y_1 - Y_M(t+\Delta t)]\Delta t / [Y_M(t+\Delta t) - Y_M(t)], \text{ if } X_1 < X_\theta < X_2 \quad (1)$$

(otherwise dead zone is not in the path of mobile client)

In (1), $[X_M(t), Y_M(t)]$ and $[X_M(t+\Delta t), Y_M(t+\Delta t)]$ are the positions of the mobile client at times t and t+$\Delta t$. These positions are communicated from the mobile client to the base station and combined with coordinates $(X_1, Y_1)$ and $X_2$ which are available at the base station. Assuming that the inequality condition stated in (1) is satisfied, the expected x- and y-coordinates of the intercept point with the dead zone, $(x_\theta, y_\theta)$ are given as:

$$X_\theta = [X_M(t+\Delta t) - X_M(t)]\Delta t_\theta/\Delta t \text{ and } Y_\theta = [Y_M(t+\Delta t) - Y_M(t)]\Delta t_\theta/\Delta t \quad (2)$$

In (1) and (2), the time difference between samples of the GPS data provided by the mobile client is $\Delta t$. The interval, $\Delta t$, is chosen such that any error in the predicted time until a dead zone is entered, $\Delta t_\theta$ is small. For example, when a mobile client is far from a dead zone such that $\Delta t_\theta >> \Delta t$ based, for example, on the first calculations in (1), then the next value for $\Delta t$ can be larger. If $\Delta t_\theta > \Delta t$ by a smaller factor, for example, 10 (i.e. $\Delta t = 0.1\Delta t_\theta$), then this may be ideal for most situations. When $\Delta t_\theta = \Delta t$, then is necessary to decrease $\Delta t$ so that $\Delta t = 0.1\Delta t_\theta$.

Changing the position sampling time interval, $\Delta t$, which is equivalent to changing the sampling interval for geographic position, $\Delta s$, since one can be estimated from the other as: $\Delta s = V\Delta t$ (where V is the velocity of the mobile client), is another advantageous feature of the invention, related to the fractal methodology.

The value for $\Delta t$ is adjusted based on the estimated proximity of the mobile client to a dead zone. From (2), new refined coordinates are used to define the boundaries of the dead zone. That is, on the basis of $x_\theta$ and $y_\theta$, new bounds are chosen. The new bounds are chosen as those closest to the stored coordinates that define the dead zone (this information is most likely stored at the base station as mentioned previously).

The new coordinate pair bounds, which are identified as $(X_3, Y_3)$ and $(X_4, Y_4)$ can be determined based on the minimum distance between $(x_\theta, y_\theta)$, and any two other coordinate pairs which describe the boundaries of the dead zone.

Figure 2:
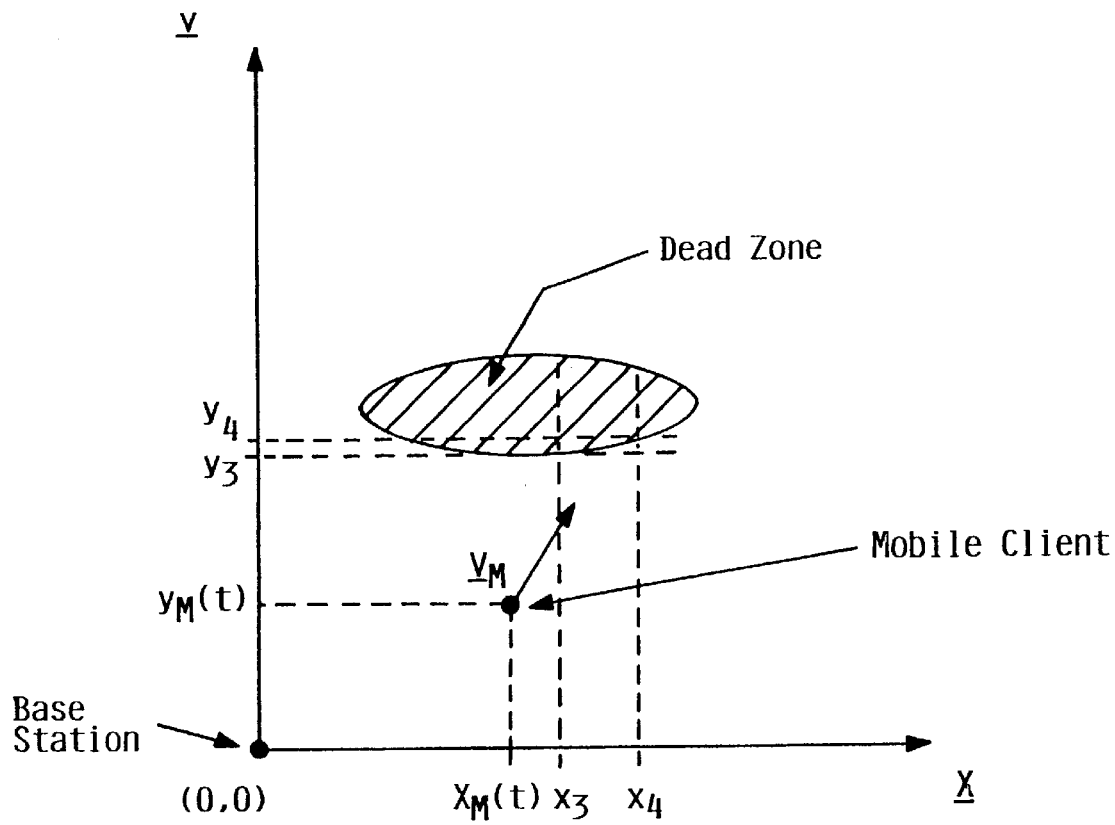
FIG. 2 illustrates a fractal refinement process for the boundary of a dead zone as a mobile client approaches according to an exemplary embodiment of the invention.

FIG. 2 illustrates a fractal refinement process for the boundary of a dead zone as a mobile client approaches according to an exemplary embodiment of the invention. In FIG. 2, the new bounds for the edge of the dead zone are shown. When the new position information for the mobile client is received by the base station, $\Delta t_\theta$ in (1) is again calculated with $Y_3$ replacing $Y_1$, and with $X_3$, $X_4$ replacing $X_1$ and $X_2$, respectively. This is followed up with new estimates for $x_\theta$ and $y_\theta$ which are obtained from (2).

This refinement for estimates of the exact interception point with the dead zone continues until the mobile client enters the dead zone. This refinement process is of a fractal-nature, since the scale of the dead zone boundary is constantly improved (like increasing fractal magnification) as the mobile client approaches. This is another advantageous feature of the invention.

When the mobile client is in the dead zone, there is no further communication possible with the base station (by definition). However, it can be presumed that the mobile client is still aware of its position either from via GPS data from a satellite, or from some other geo-positioning system, e.g., an internal inertial guidance system. Before the mobile client enters the dead zone, information concerning the expected time when the dead zone will be exited can be sent from the base station. Alternatively, the base station can send relevant dead zone coordinates for the boundary at which point the mobile client is expected to exit the dead zone. Calculations given in (1) and (2) can then be performed by a processor in the mobile client. Details are not given here for the sake of brevity, however, it should be considered within the ability of one skilled in the art to extend the notions developed earlier to this case.

Two-way exchange of information regarding the boundary of a dead zone is another advantageous feature of the invention. In some cases, the mobile client may become immobile for some extended period of time. For example, a mobile client enters a building and then encounters an unexpected delay.

When the base station and/or mobile client does not establish communication within some tolerance surrounding the expected time of emergence from a dead zone, the communication is placed on hold, and further data to be communicated would be placed in a hold queue. When communication is again possible, the mobile client provides its position information to the base station and the communication data is removed from the hold queue.

Figure 3A:
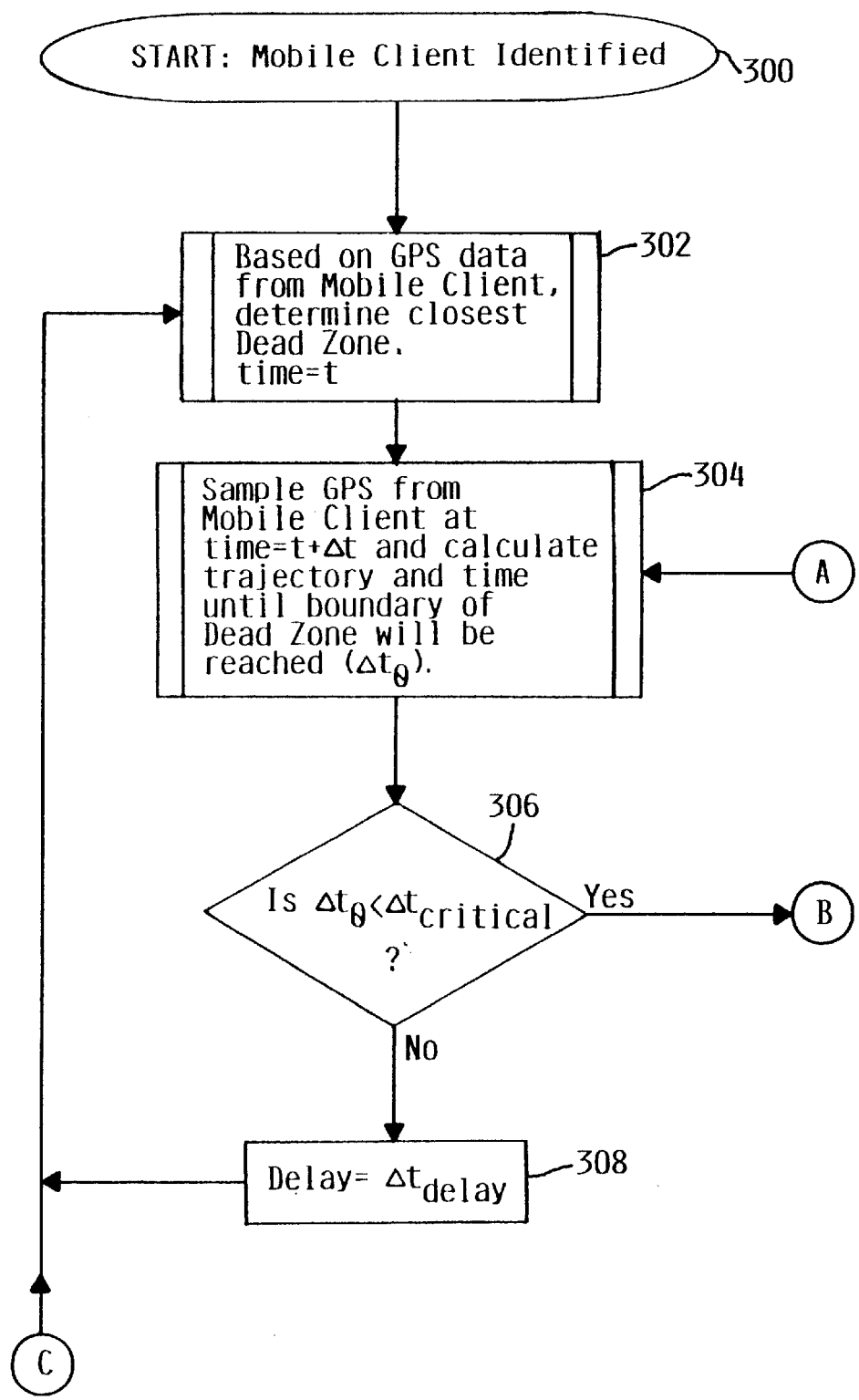
FIG. 3 illustrates a flow chart of a process of tracking and anticipating mobile client proximity to a dead zone according to an exemplary embodiment of the invention.
Figure 3B:
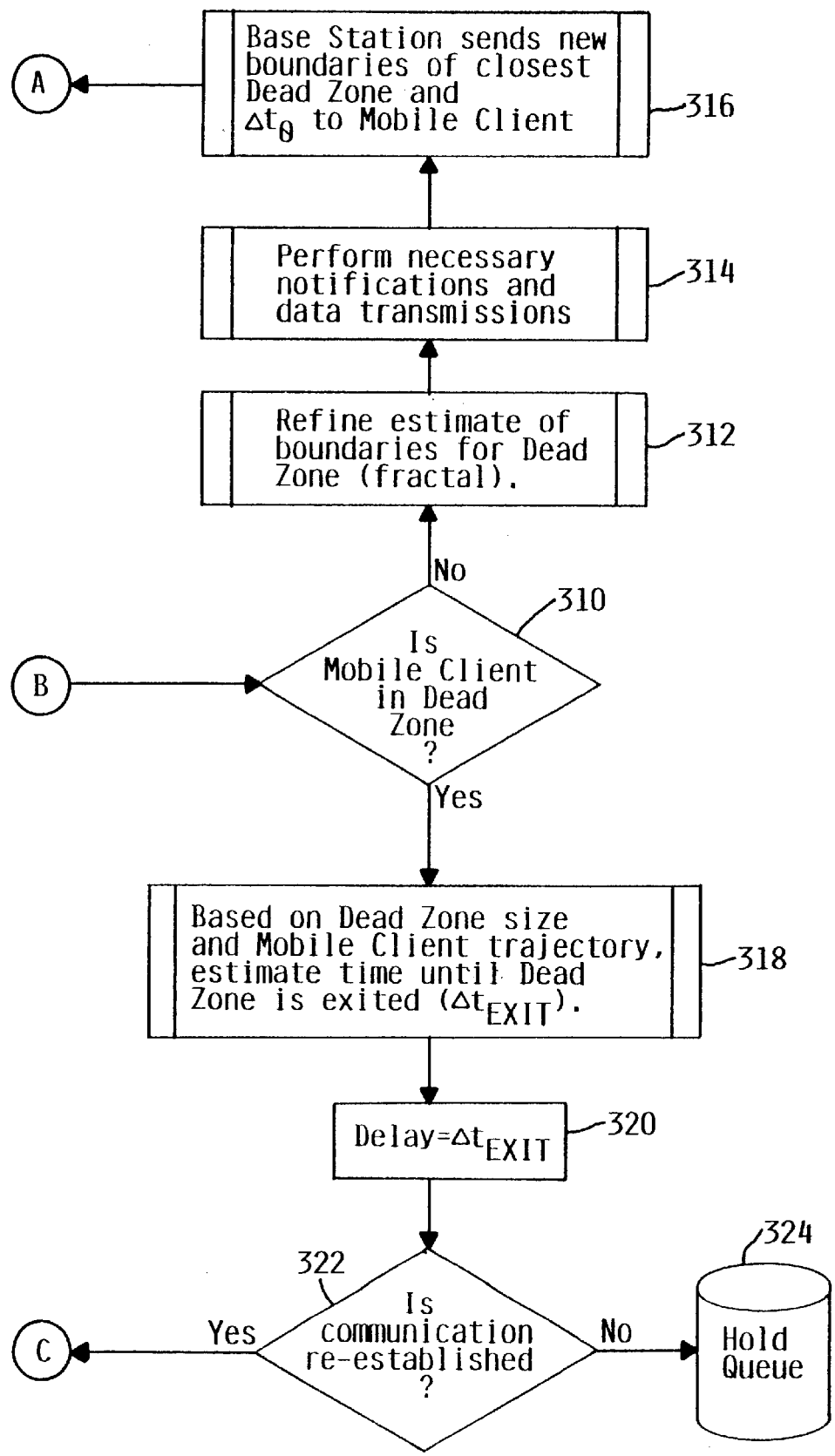

FIG. 3 illustrates a flow chart of a process of tracking and anticipating mobile client proximity to a dead zone according to an exemplary embodiment of the invention. The communication protocol for several scenarios is depicted in FIG. 3.

In FIG. 3, the process begins with 300 the identification of a mobile client. Only one mobile client is assumed but the concepts are trivially extendible to multiple mobile clients because each mobile client must, by definition, be identifiable for communication. After the mobile client has been identified at 300, flow proceeds to 302 where GPS (position data) is sent to the base station and the base station uses the position information to determine the closest dead zone relative to the position of the mobile client. At this point, it could be safe to ignore the dead zone (if it is very far from the position of the mobile client).

However, FIG. 3 assumes (304) that it is prudent to again sample the position at t=Δt, where Δt might be on the order of 1 to 10 seconds, for example. Now having two position points and Δt, (1) and (2) are used to estimate the time until the dead zone is entered, $\Delta t_\theta$.

If at 306, it is determined that $\Delta t_\theta$ is greater than some critical time, $\Delta t_{critical}$, then flow proceeds to 308 where an appropriate time delay, $\Delta t_{delay}$, is used before sampling the position of the mobile client again (302–304).

If at 306, it is judged that $\Delta t_\theta$ is less than $\Delta t_{critical}$, and the mobile client is not in the dead zone as determined at 310, then the base station could take action to transfer data at a higher priority or inform the network that the mobile client will soon be "off-line". In addition, the base station can provide to the mobile client the time to entry for the dead zone and well as its boundaries. In this way, it is not necessary for the mobile client to store the detailed boundaries, for all dead zones. This simplification saves storage an processing requirements for the mobile client hardware and is another advantageous feature of the invention.

However, FIG. 3 illustrates another feature of the invention when it is determined that the mobile client is not in the dead zone at 310. At 312, a refinement of the estimate of the dead zone boundaries is performed according to the fractal methodology described earlier. At 314, the base station notifies the mobile client and transmits necessary data. At 316, the base station sends new boundaries of closest dead zone and $\Delta t_\theta$ to the mobile client. Having done this, the position of the mobile client is again sampled and the process repeated (304–306).

When the mobile client is in the dead zone as determined at 310, the time that is it expected to be "off-line" until it has exited the dead zone, $\Delta t_{exit}$ is estimated at 318. If after this time $\Delta t_{exit}$ (320) communication is not reestablished as determined at 322, a hold queue 324 is used to buffer communications until the mobile client is back on-line.

When communication is reestablished between a mobile client and base station as determined at 322, both the mobile client and base station will have knowledge of any change in the expected boundary, and this information is integrated into the existing dead zone data base. This dynamic Updating of dead zone boundaries is yet another advantageous feature of the invention.

As mentioned earlier, the exchange of position information can be facilitated by use of a data transmission protocol that includes GPS (or other type) position information, according to an aspect of the invention.

Figure 4:
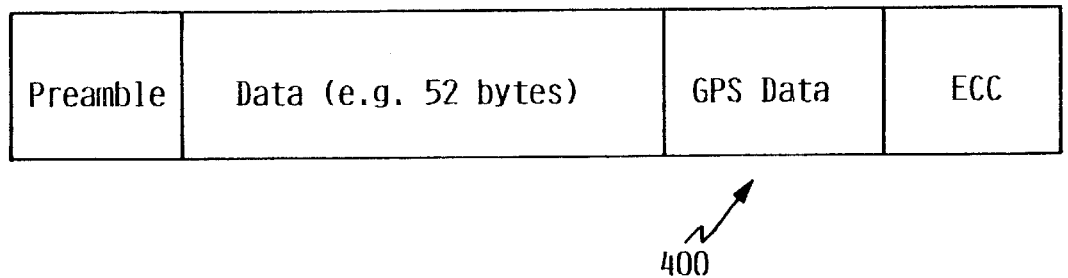
FIG. 4 illustrates a packet protocol according to an exemplary embodiment of the invention.

FIG. 4 illustrates a packet protocol according to an exemplary embodiment of the invention. Assuming packet transmission (which is optimal in general for mobile communication), some packets include GPS information 400 as shown in FIG. 4. Additionally, some packets can include the estimated time before a mobile client will enter a dead zone and/or how long communication will be interrupted. This information, as has been mentioned at the beginning of this invention disclosure, can be used to schedule transmissions between base station and mobile client. The novel GPS packet protocol is yet another advantageous feature of the invention. The protocol is set forth below and is shown in FIG. 4.

| Preamble | Data (e.g. 52 bytes) | GPS Data | ECC |
|---|---|---|---|

It should be readily apparent to one skilled in the art that the position information, e.g., GPS data, could be included in other data transmission formats and protocols, and the invention is not limited to being implemented in a packet-based transmission system. Although packet based communication systems are widespread, the various aspects of the invention are applicable to other types of systems.

Figure 5:
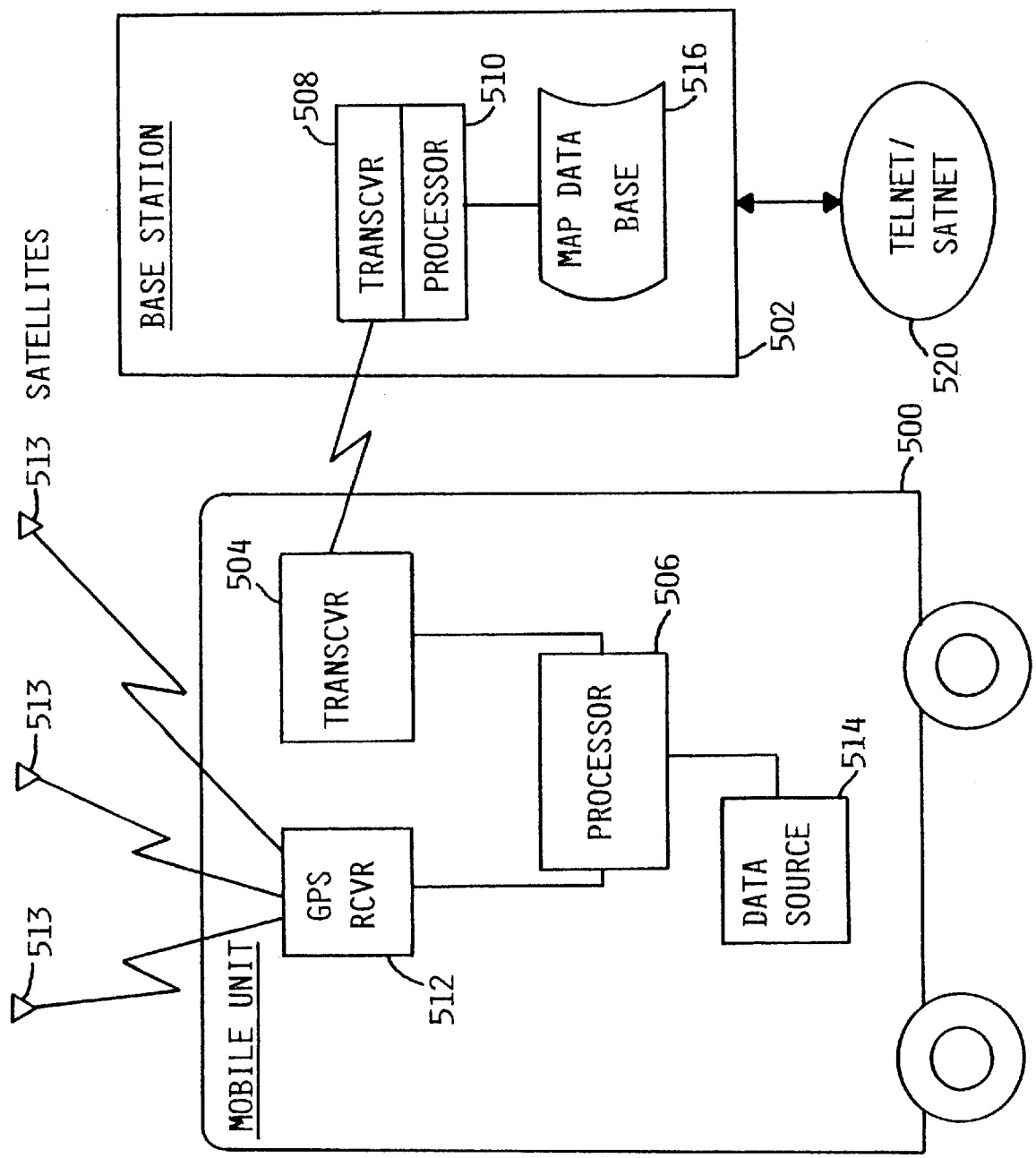
FIG. 5 illustrates a communications system according to an exemplary embodiment of the invention.

FIG. 5 illustrates an exemplary embodiment of a communications system according to the invention. A mobile unit communicates with a base station by means of a wireless communications medium (air). A transceiver 504 in the mobile unit 500, under control of a processor 506, transmits and receives signals with a corresponding transceiver 508 and processor 510 at the base station 502. The mobile station 500 also includes some global positioning capability, e.g., a GPS receiver 512 receiving signals from a plurality of GPS satellites 513. The mobile unit 500 may have a data source 514, such as a personal computer, fax machine, or the like, which sends blocks of data through the processor 506 and transceiver 504 to the base station 502. The base station 502 would of course be connected to a telephone network (telnet) or satellite communications network (satnet), or combination thereof, e.g., the Iridium system which is a combination of terrestrial, satellite, and cellular networks, as represented by block 520, as is conventional. A map data base 516 is provided at the base station 502 and contains a data base of identified areas where communication is weak or cutoff completely, i.e., dead zones, within the geographical area served by the base station 502.

The map data base 516 could also contain some geographical data about adjoining areas served by other base stations (not shown) for those situations where a mobile unit 500 is traveling towards such an area. In such a case, the base station 502 could transmit location information to the mobile unit 500 concerning dead zones that adjoin the area served by the base station 502. Or it could be the case that a dead zone actually spans areas served by two different base stations, and such information can be passed to the mobile unit 500.

The mobile unit processor 506 processes the GPS data, and sends position/direction of travel information to the base station 502. The base station processor 510 receives the mobile unit's position/direction of travel information and determines the mobile unit's position relative to known dead zones, as described earlier. The processor 510 may also update the information in the map data base 516 based on the mobile unit's position, and any detected transmission errors or signal weakening, for example.

Figure 6:
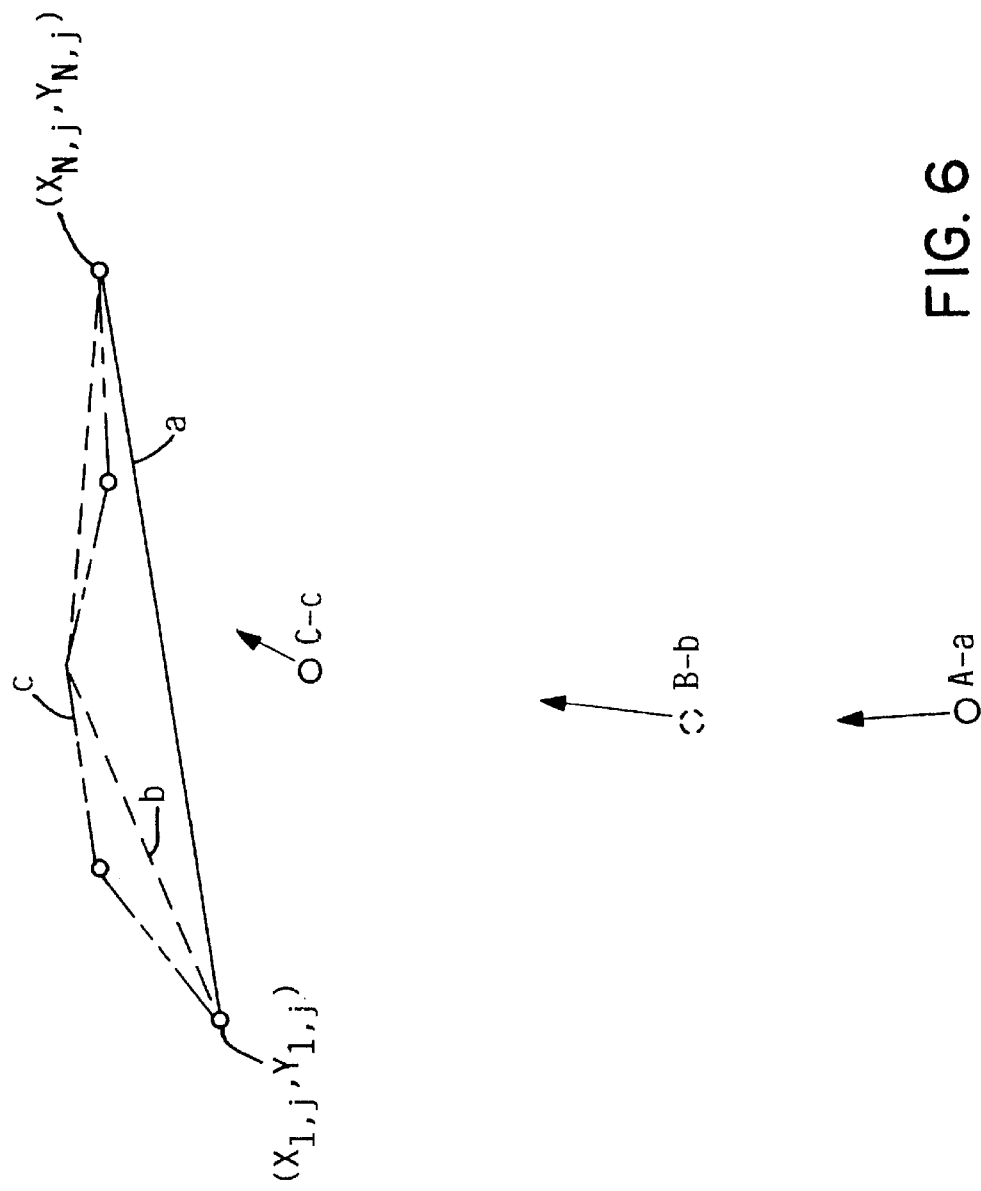
FIG. 6 illustrates a fractal refinement of a dead zone boundary based on proximity and estimated time to contact according to an exemplary embodiment of the invention.

FIG. 6 illustrates a fractal refinement of a dead zone boundary based on proximity and estimated time to contact according to an exemplary embodiment of the invention. A mobile unit is shown at three different positions: A-a, B-b and C-c. These positions could be known from GPS, Doppler radar, inertial navigation, or other known mechanisms, as would be apparent to one skilled in the art. The dead zone boundary that is used to estimate the time until a mobile unit enters the dead zone depends on the relative distance between the mobile unit and the dead zone. For example, when the mobile unit is at location A-a, a straight line approximation of the boundary can be used. This is shown in FIG. 6 as the straight line between points $(X_{1j}, Y_{1j})$ and $(X_{Nj}, Y_{Nj})$ which is labeled "a". Here, there are a total of N coordinate pairs that describe this jth dead zone. When the mobile unit is at position B-b, a better estimate of the estimated time until entry can be obtained by "fractalizing" the boundary as shown by the dashed line labeled "b". When the mobile unit is at location C-c, which is much closer to the dead zone boundary than either A-a or B-b, a further refinement of the boundary is used. This is shown by line segments labeled "c". By using boundary "c" rather than either boundaries "a" or "b", a better estimate of the true time until the dead zone is entered is obtained.

The illustrated communication system is presented for the purposes of explanation and the invention is not meant to be limited strictly thereto. For example, instead of GPS satellite positioning, the mobile unit might use other means, such as Doppler radar (phase shift and signal time) methodology or inertial navigation methodology, where appropriate.

Some examples of how the various aspects of the invention can benefit wireless communications are set forth below:

1. A mobile client is expecting a large amount of data from a server (base station), for example, video information for a video display. Based on the trajectory (velocity and direction) of the mobile client relative to the base station, entry of a dead zone is expected in N minutes. The base station, therefore, sets the mobile client to a higher priority communication so that sufficient data is sent to the mobile client to enable uninterrupted video display for the duration of the dead zone.

2. A mobile client is preparing to send, for example, a large transmission, e.g., email or video, or a critical transmission, such as a stock buy/sell order, to a base station. However, the mobile client is approaching a dead zone. With the knowledge of the relative position of the mobile client to the dead zone, the transmission can (a) be deemed a high priority communication by the base station and reception advanced, or (b) be delayed until the mobile client exits the dead zone. The need for constant polling by the base station to see when the mobile client is available for communication can be virtually eliminated because of the knowledge of the mobile client and dead zone locations.

3. When a base station is communicating with multiple mobile clients, prioritization of transmissions based on the relative positions of each mobile client with respect to one or more dead zones uses bandwidth more efficiently. Such an arrangement advantageously avoids constantly sending data that can never be received, or is not acknowledged, because one or more of the mobile clients are in a respective dead zone.

The above-mentioned problems are solved by considering geographical information when a client/server, e.g., mobile client/base station, communication is negotiated. Known dead zones are used to schedule communication. Dynamic updating based on changing dead zone boundaries is also advantageously provided.

The above described solution benefits data communication over a wireless system, such as radio, cellular telephone, or optical point-to-point, for example, which is naturally interrupted by obstacles. Previously, the transmitter of information might be notified by the receiver that some transmitted information was not received. Typically, the data would either be retransmitted immediately, or after a time delay. In either case, if the reason for the lack of reception is due to the relative location of transmitter and receiver, i.e., with respect to a dead zone, this information was not known by the transmitter or receiver. Wasted time and bandwidth would occur, if for example, a transmitter tries to repeat a transmission when the receiver is totally incapable of receiving the information. This might occur, for example, it the receiver is in a vehicle and the vehicle is inside of a tunnel which is naturally shielded from radio transmissions, i.e., in a dead zone.

The solution to the problem, according to aspects of the above exemplary embodiments of the invention, is that via a location device, such as a GPS or inertial navigation/positioning device located at the mobile transmitter (server) and/or mobile receiver (client), the transmission of information can be biased toward those receivers which are currently in a clear reception path. This knowledge permits a transmitter to decide when and to whom information is sent.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims. For example, although the disclosed system according to an embodiment of the invention uses a GPS system for positioning the mobile unit, the invention is not limited to only this positioning mechanism. As mentioned above, the location of a mobile client relative to a base station can be provided by a positioning system, such as a Global Positioning Satellite/System (GPS), Doppler radar, visual contact, triangulation, an inertial guidance system (IGS), or any other equivalent geo-positioning system.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

what is claimed is:

1. A method of communication between a base station having a communication zone and a mobile unit, comprising:

determining an actual location and direction of travel of the mobile unit relative to a dead zone within the communication zone by comparing a present location and direction of travel of the mobile unit with stored dead zone information, the dead zone being a geographical area subject to at least one of: signal shadowing; signal reflection; signal absorption; and signal interference; wherein the determining further comprises:

determining a rate of travel of the mobile unit towards a dead zone; and estimating an amount of time before the mobile unit enters a dead zone based on the rate of travel and location of the mobile unit, wherein the estimating comprises using a fractal-type methodology having a frequency of repeating, including:
repeating the location and rate of travel determining:
repeating the estimating the amount of time before the mobile unit enters a dead zone based on the repeated determining of the rate of travel and location of the mobile unit; and
increasing proportionally the frequency of repeating the location and rate of travel determining and the time before the mobile unit enters a dead zone estimating, as the location of the mobile unit relative to the dead zone becomes closer;
whereby the estimate of the amount of time before the mobile unit enters a dead zone is repetitively refined; and
scheduling communication between the base station and the mobile unit based on the determining.

2. A method of communication between a base station having a communication zone and a mobile unit, comprising:
determining an actual location and direction of travel of the mobile unit relative to a dead zone within the communication zone by comparing a present location and direction of travel of the mobile unit with stored dead zone information, the dead zone being a geographical area subject to at least one of: signal shadowing; signal reflection; signal absorption; and signal interference, wherein the determining further comprises:
determining a rate of travel of the mobile unit towards a dead zone; and
estimating an amount of time before the mobile unit enters a dead zone based on the rate of travel and location of the mobile unit, and
scheduling communication between the base station and the mobile unit based on the determining, wherein the scheduling comprises:
estimating an amount of time required to transmit a quantity of data;
comparing the estimated amount of time before the mobile unit enters a dead zone to the estimated amount of time required to transmit the quantity of data; and
if the estimated amount of time required to transmit the quantity of data is greater than the estimated time before the mobile unit enters a dead zone, then delaying transmission of the quantity of data.

3. A method of communication between a base station having a communication zone and a mobile unit, comprising:
determining an actual location and direction of travel of the mobile unit relative to an identified communication area within the communication zone, wherein the determining comprises:
utilizing global positioning satellites to obtain current geographical location information in the mobile unit;
transmitting the current geographical location information from the mobile unit to the base station;
determining a rate of travel of the mobile unit towards a dead zone;
estimating an amount of time before the mobile unit enters a dead zone and an amount of time to traverse the dead zone by the mobile unit, based on the determined rate of travel, location and direction of travel of the mobile unit; and
prior to entering a dead zone, estimating and transmitting geographical coordinates corresponding to an approximate dead zone exit location from the base station to the mobile unit;
upon the mobile unit entering the dead zone, ceasing communication between the mobile unit and the base station;
detecting in the mobile unit when the estimated dead zone exit coordinates have been reached and then attempting to resume communication between the mobile unit and the base station; and
redefining dead zone exit coordinates based on the location where communication is successfully resumed if that location is different from the estimated dead zone exit coordinates; and
scheduling communication between the base station and the mobile unit based on the determining.

4. A method of communication between a base station having a communication zone and a plurality of mobile units, comprising:
determining an actual location and direction of travel of the mobile unit relative to an identified communication area within the communication zone; and
scheduling communication between the base station and the mobile unit based on the determining, wherein the scheduling comprises prioritizing mobile unit and base station transmissions when a mobile unit reaches a location within a predetermined distance from the communication area, and
wherein communication between mobile units and the base station is based on multiplexing the transmission resources of the base station among mobile units with which the base station is communicating, and wherein the prioritizing comprises:
allotting additional transmission resources to a mobile unit that has reached the location within the predetermined distance from the communication area.

5. The method according to claim 4, further comprising:
storing information for transmission to a mobile unit in a hold queue while the mobile unit is within a communication area which is a dead zone.

6. A method of communication between a base station having a communication zone and a mobile unit, comprising:
determining an actual location and direction of travel of the mobile unit relative to an identified communication area within the communication zone, wherein the determining comprises:
determining the location and direction of travel of the mobile unit with the mobile unit;
communicating the location and direction of travel of the mobile unit as mobile unit position information from the mobile unit to the base station;
comparing the mobile unit position information to stored communication area position information with the base station to determine if the mobile unit is approaching a communication area;
if the base station determines that the mobile unit is approaching a communication area, then:
determining an estimated time until the mobile unit enters the communication area as estimated-time-until-arrival information; and
communicating the estimated-time-until-arrival information from the base station to the mobile unit, and
scheduling communication between the base station and the mobile unit based on the determining, wherein the scheduling comprises:

estimating a time required to process and transmit a quantity of data from the mobile unit to the base station, with the mobile unit;

comparing the time estimated for processing and transmission of the quantity of data with the estimated-time-until-arrival information;

if the comparing indicates that the time estimated for processing and transmission of the quantity of data is greater than the estimated-time-until-arrival, then delaying transmission of the quantity of data; and if the comparing indicates that the time estimated for processing and transmission of the quantity of data is not greater than the estimated-time-until-arrival, then beginning a transmission the quantity of data.

7. The method according to claim 6, wherein if transmission of the quantity of data is delayed, the further comprising:

estimating a time required for the mobile unit to traverse the communication area the mobile unit is approaching as a time of traversal;

when the mobile unit enters the communication area, waiting until the time of traversal has elapsed; and then attempting to transmit the quantity of data whose transmission was delayed.

8. A communications system for facilitating wireless communication between a base station having a communication zone and at least one mobile unit, comprising:

positioning means in the at least one mobile unit for determining an actual instantaneous geographical position and direction of travel of the at least one mobile unit;

forwarding means in the at least one mobile unit for forwarding the instantaneous geographical position and direction of travel of the at least one mobile unit to the base station;

identified communication area data base means in the base station for storing a data base of identified communication area locations within the communication zone;

comparing means in the base station for comparing the forwarded instantaneous geographical position and direction of travel of the at least one mobile unit with the data base of identified communication area locations within the communication zone, and determining a relative position of the at least one mobile unit with respect to the identified communication area locations; and scheduling means in at least one of the base station and the mobile unit, for scheduling communications between the base station and the mobile unit based on the relative position of the at least one mobile unit with respect to the identified communication area locations.

9. The system according to claim 8, wherein the positioning means comprises a global positioning satellite system.

10. The system according to claim 8, wherein the positioning means comprises an inertial navigation system.

11. The system according to claim 8, wherein the positioning means comprises a combination of a global positioning satellite system and an inertial navigation system.

12. The system according to claim 8, wherein the positioning means comprises a visual-based navigation system.

13. The system according to claim 8, wherein the positioning means comprises a sensor-based navigation system.

14. The system according to claim 8, wherein the scheduling means comprises estimating means for estimating an amount of time before the at least one mobile unit enters an identified communication area location.

15. The system according to claim 14, wherein the estimating means comprises fractal means for refining the estimating of the amount of time before the at least one mobile unit enters an identified communication area location based on the instantaneous geographical position of the at least one mobile unit.

16. The system according to claim 15, wherein there are a plurality of mobile units and a plurality of identified communication area locations, and wherein the scheduling means further comprises prioritizing means for prioritizing communications with the mobile units based on at least one of:

the type of communication to be made with a respective mobile unit;

the respective relative position of a mobile unit with respect to the identified communication area locations; and the respective bandwidth used by a respective mobile unit.

17. The system according to claim 8, wherein the identified communication area locations within the communication zone are locations where communication between the base station and a mobile unit within the location is not possible, and wherein the system further comprises queue means for storing data when communication with the at least one mobile unit is not possible.

18. The system according to claim 17, wherein the scheduling means comprises exit estimating means for estimating a time when the at least one mobile unit will exit a location where communication between the base station and a mobile unit within the location is not possible.

* * * * *

UNITED STATES PATENT AND TRADEMARK OFFICE
CERTIFICATE OF CORRECTION

PATENT NO.    : 6,597,906 B1
DATED         : July 22, 2003
INVENTOR(S)   : George Willard Van Leeuwen et al.

It is certified that error appears in the above-identified patent and that said Letters Patent is hereby corrected as shown below:

<u>Column 8,</u>
Lines 19 through 24, paragraph should be deleted in its entirety.

Signed and Sealed this

Fourth Day of November, 2003

JAMES E. ROGAN
*Director of the United States Patent and Trademark Office*